United States Patent
Shin et al.

(10) Patent No.: US 9,058,758 B2
(45) Date of Patent: Jun. 16, 2015

(54) CURVED DISPLAY DEVICE AND METHOD OF CONTROLLING CURVATURE THEREOF

(71) Applicant: LG Display Co., Ltd., Seoul (KR)

(72) Inventors: Mi-Na Shin, Paju-si (KR); Seung-Hee Lee, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 2 days.

(21) Appl. No.: 14/107,181

(22) Filed: Dec. 16, 2013

(65) Prior Publication Data

US 2015/0035812 A1 Feb. 5, 2015

(30) Foreign Application Priority Data

Jul. 31, 2013 (KR) .......................... 10-2013-0091136

(51) Int. Cl.
| | |
|---|---|
| *G06F 3/038* | (2013.01) |
| *G09G 5/00* | (2006.01) |
| *G09G 3/36* | (2006.01) |
| *G02F 1/1333* | (2006.01) |
| *G06F 1/16* | (2006.01) |

(52) U.S. Cl.
CPC ................ *G09G 5/00* (2013.01); *G09G 3/3688* (2013.01); *G02F 1/133308* (2013.01); *G06F 1/1601* (2013.01); *G02F 2001/133314* (2013.01)

(58) Field of Classification Search
None
See application file for complete search history.

(56) References Cited

U.S. PATENT DOCUMENTS

| | | | | |
|---|---|---|---|---|
| 5,990,618 | A | * | 11/1999 | Morita et al. .................. 313/582 |
| 2004/0017528 | A1 | * | 1/2004 | Kano et al. ..................... 349/113 |
| 2010/0188422 | A1 | | 7/2010 | Shingai et al. |
| 2013/0114193 | A1 | | 5/2013 | Joo et al. |

FOREIGN PATENT DOCUMENTS

| | | |
|---|---|---|
| EP | 2610667 A1 | 7/2013 |
| EP | 2667247 A1 | 11/2013 |
| JP | 10-268790 A | 10/1998 |
| JP | 2003-330384 A | 11/2003 |
| JP | 2005-331872 A | 12/2005 |
| JP | 2006-023676 A | 1/2006 |
| JP | 2008-197446 A | 8/2008 |
| JP | 2008-276035 A | 11/2008 |
| JP | 2009-222844 A | 10/2009 |
| JP | 2011-027921 A | 2/2011 |
| JP | 2013-134295 A | 7/2013 |

\* cited by examiner

*Primary Examiner* — Muhammad N Edun
(74) *Attorney, Agent, or Firm* — McKenna Long & Aldridge LLP

(57) ABSTRACT

Disclosed are a curved display device and a driving method thereof. The curved display device includes a flexible display panel, a bottom cover serving as a rear surface casing for the display panel, and at least one curvature control unit disposed on a rear surface of the bottom cover to control curvature of the bottom cover by applying tensile force to the rear surface of the bottom cover in a longitudinal direction of the bottom cover. The bottom cover is formed of a corrugated board including an intermediate layer provided with ridges, a first cover layer serving as a coating for an upper surface of the intermediate layer, and a second cover layer serving as a coating for a lower surface of the intermediate layer. The first cover layer has an opening configured to expose the intermediate layer to correspond to the curvature control unit.

10 Claims, 14 Drawing Sheets

FIG. 1
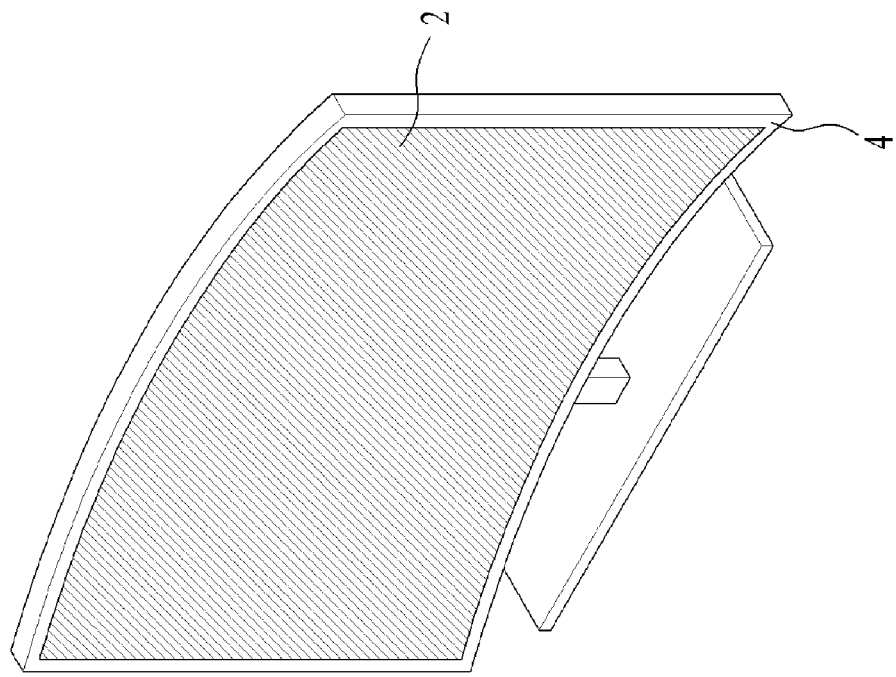
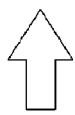
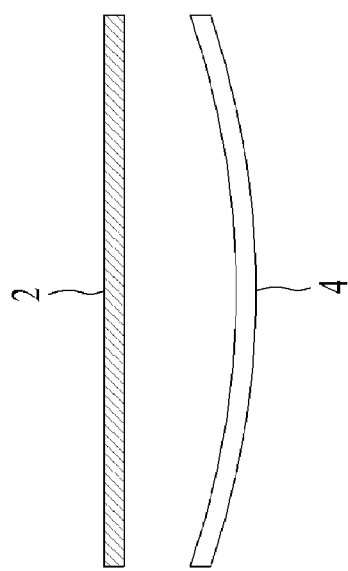

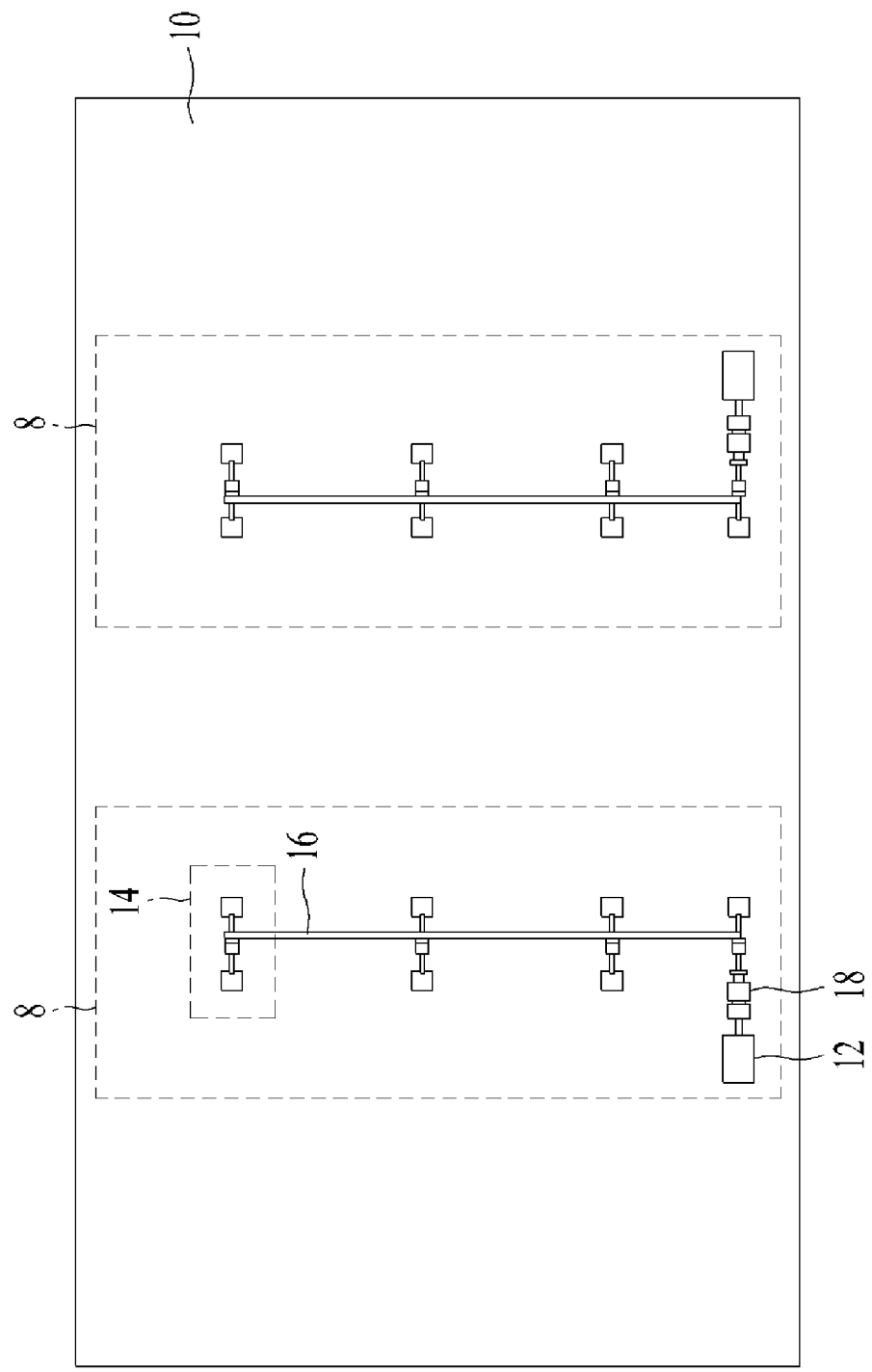

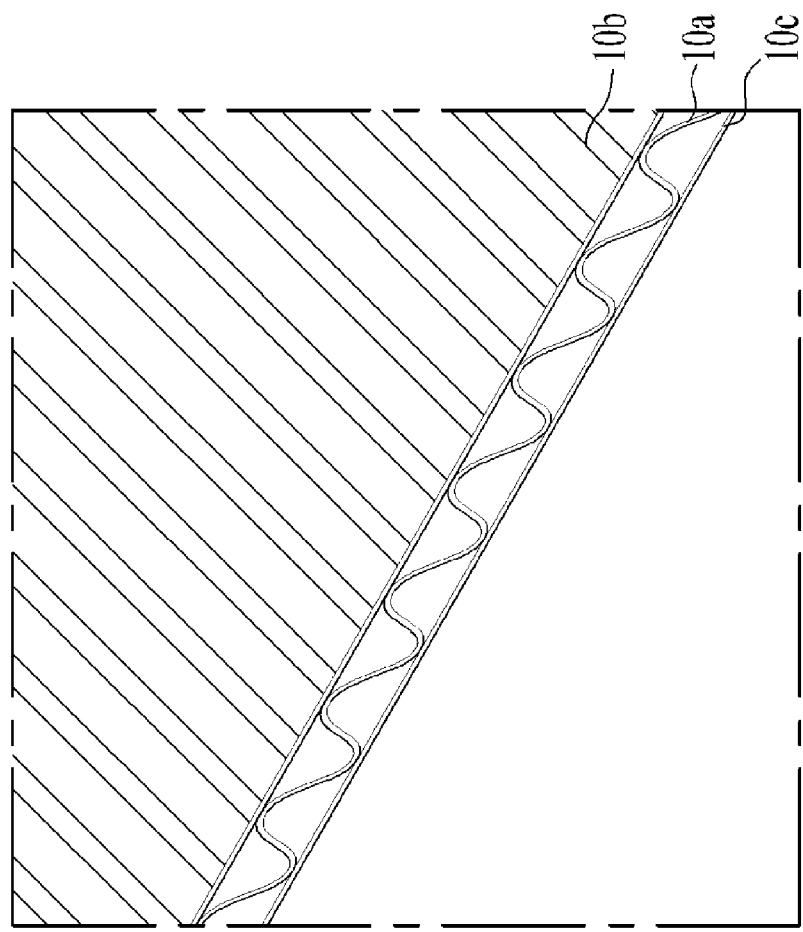

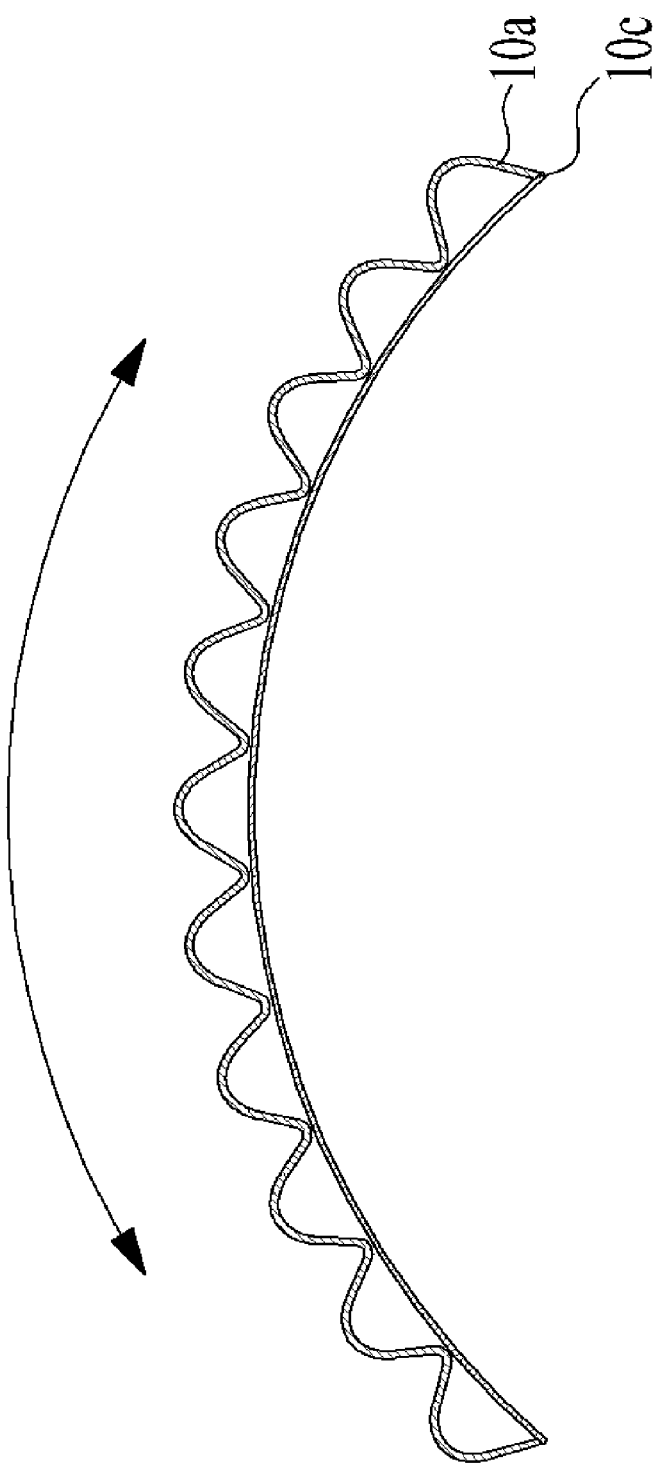

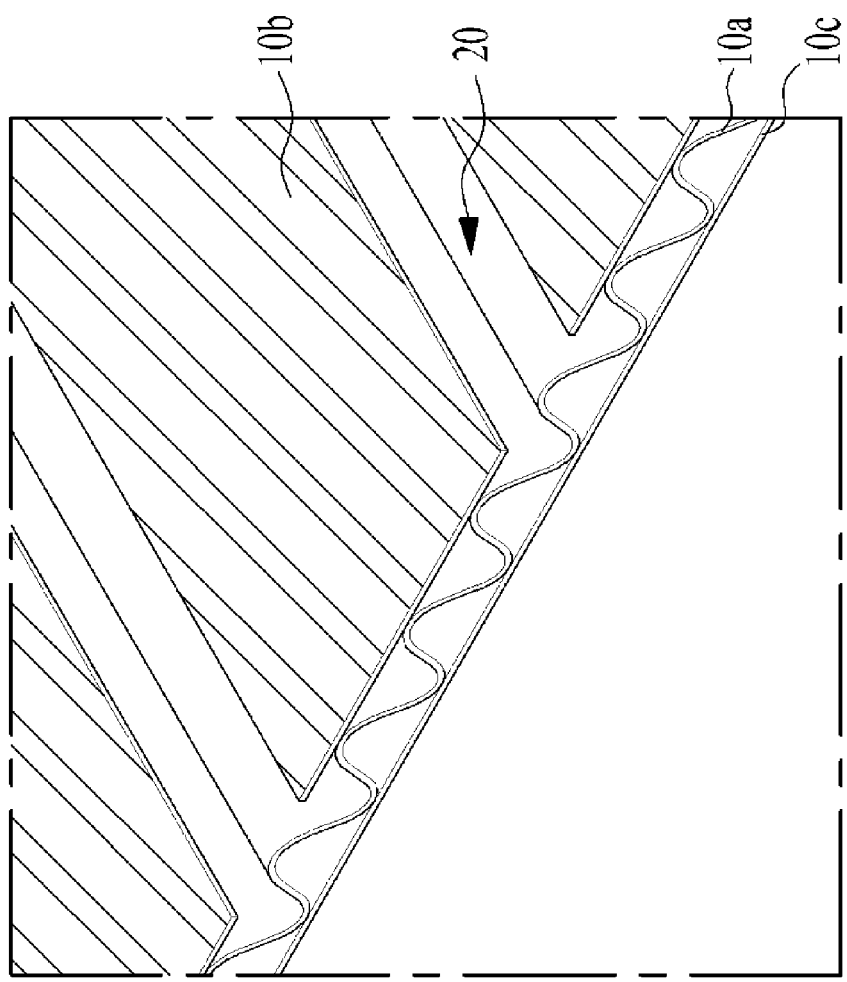

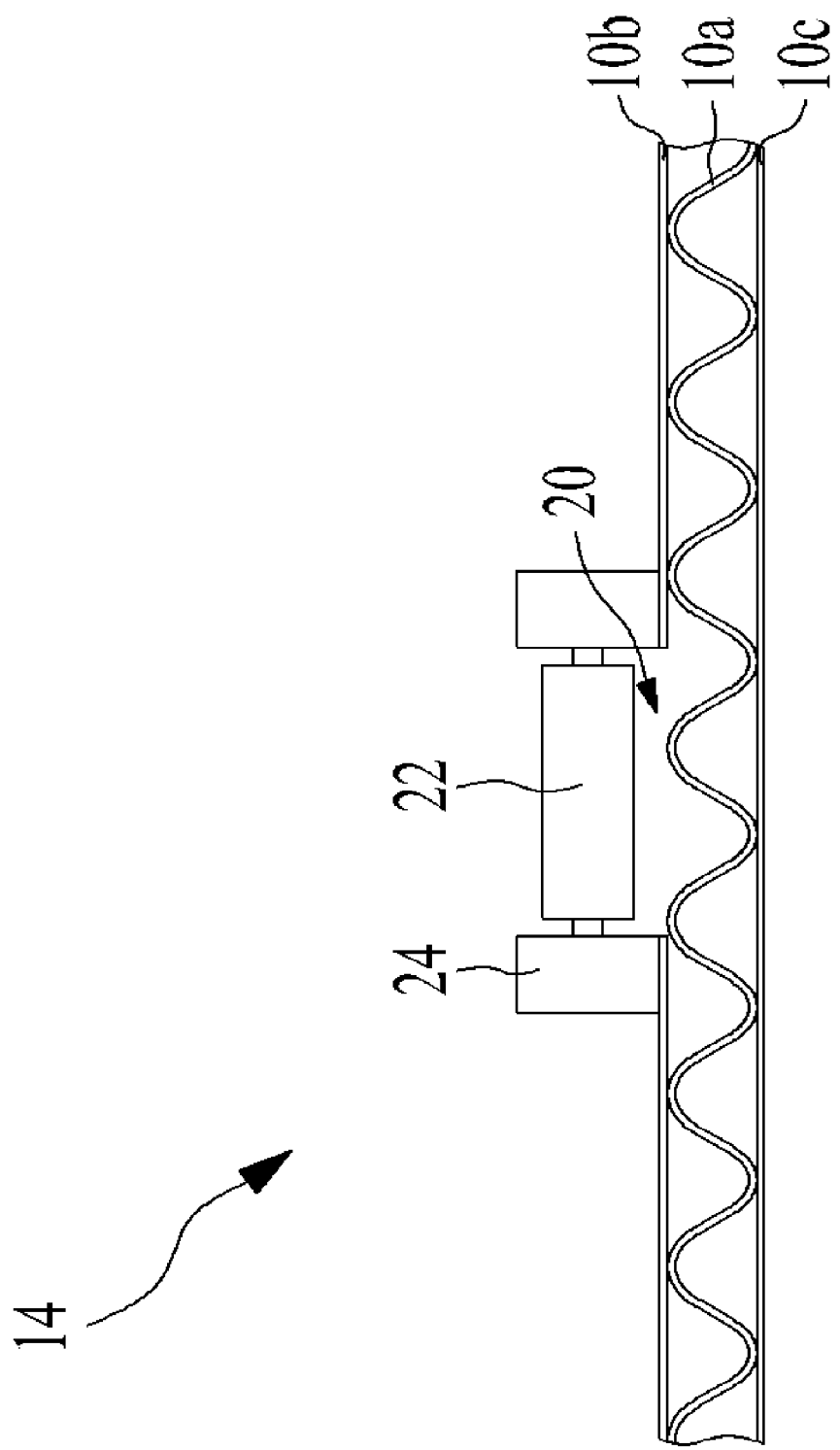

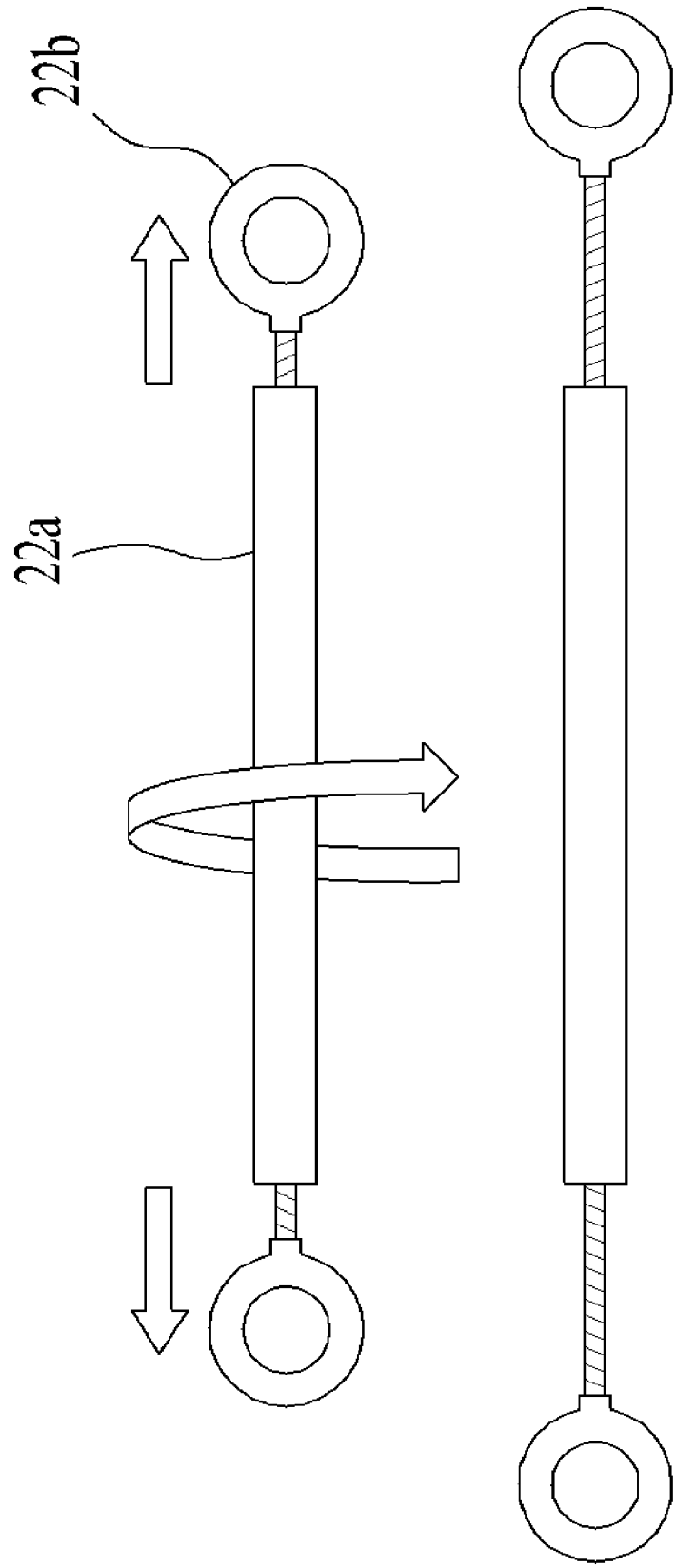

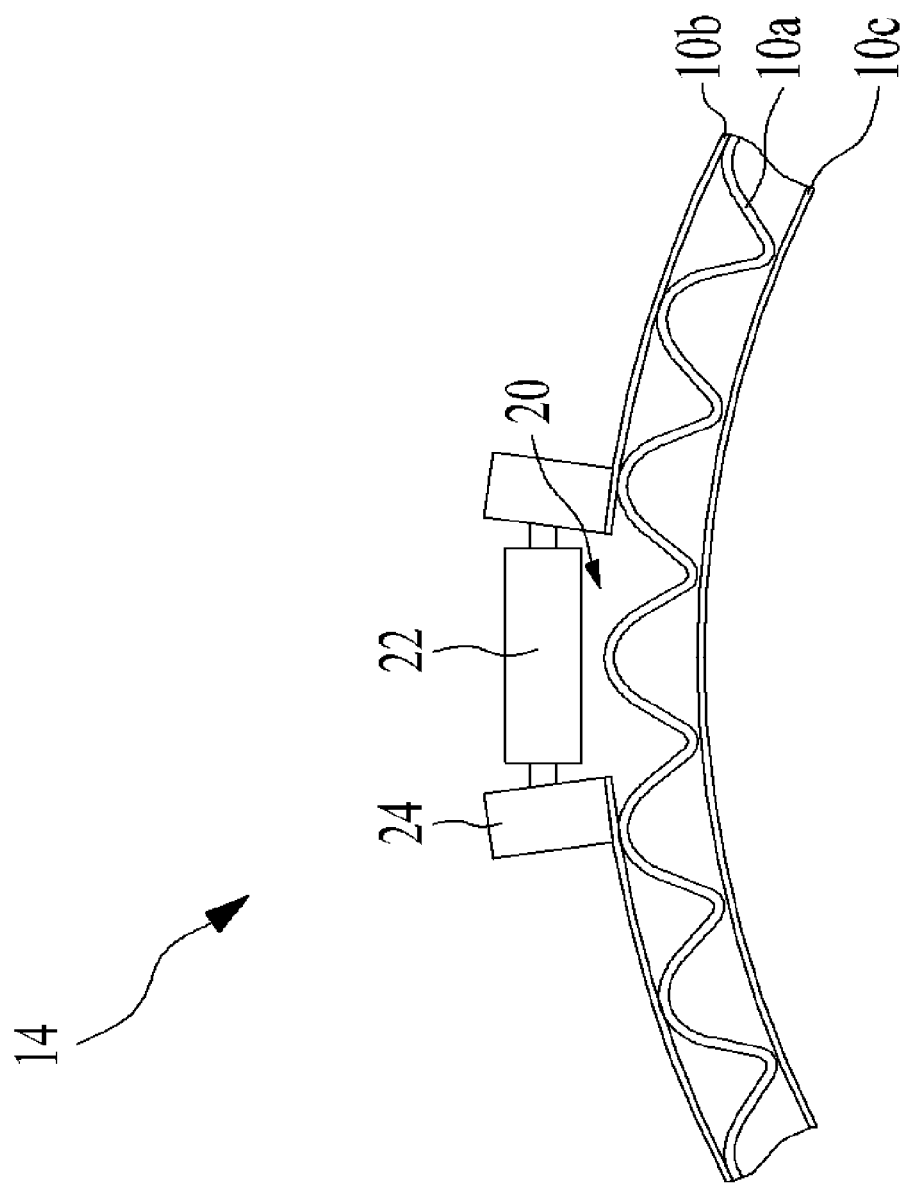

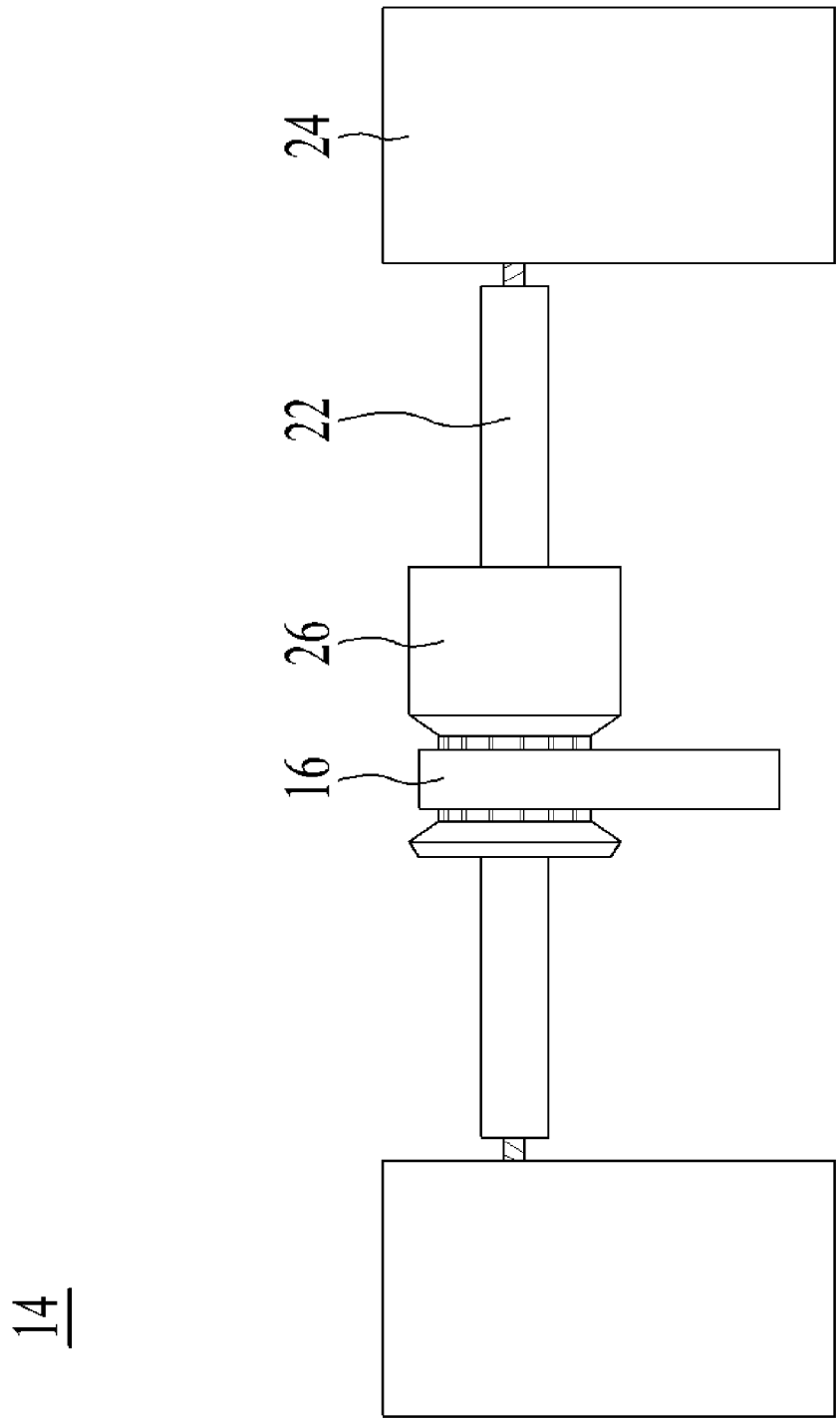

CURVED DISPLAY DEVICE AND METHOD OF CONTROLLING CURVATURE THEREOF

CROSS-REFERENCE TO RELATED APPLICATIONS

This application claims the benefit of Korean Patent Application No. 10-2013-0091136, filed on, Jul. 31, 2013, which is hereby incorporated by reference for all purposes as if fully set forth herein.

BACKGROUND OF THE INVENTION

1. Field of the Invention

The present invention relates to a curved display device and a method of controlling curvature thereof.

2. Discussion of the Related Art

Flat panel display devices are used quite often in the development of display technologies. Such flat panel display devices include Liquid Crystal Display (LCD) devices and Organic Light Emitting Diode (OLED) display devices, for example. Most flat panel display devices are used in TVs, laptop computers, MP3 players, cellular phones, and the like.

Typically, flat panel display devices include a planar screen. However, flat panel display devices having a curved screen may be more suitable for some users. Accordingly, as exemplarily shown in FIG. 1, a method of manufacturing a curved display device by coupling a display panel 2 to a casing member 4 having a specific curvature has been introduced in the related art.

The curved display device of the related art, however, makes it difficult for a user to vary the curvature of the display panel according to desired situations because of mass production of the casing member 4 having a fixed curvature.

SUMMARY OF THE INVENTION

Accordingly, the present invention is directed to a curved display device and a method of controlling curvature thereof that substantially obviate one or more problems due to limitations and disadvantages of the related art.

An object of the present invention is to provide a curved display device and a method of controlling curvature thereof which enable variation in the curvature of a display panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a curved display device includes a display panel, a bottom cover serving as a rear surface casing for the display panel, and at least one curvature control unit disposed on a rear surface of the bottom cover to control curvature of the bottom cover by applying tensile force to the rear surface of the bottom cover in a longitudinal direction of the bottom cover, wherein the bottom surface of the bottom cover is formed of a corrugated board including an intermediate layer provided with ridges, a first cover layer serving as a coating for an upper surface of the intermediate layer, and a second cover layer serving as a coating for a lower surface of the intermediate layer, and wherein the first cover layer has an opening configured to expose the intermediate layer to correspond to the curvature control unit.

The curvature control unit may include a plurality of tightening members arranged along the opening perforated in a width direction of the bottom cover, a motor configured to generate power, and a transmission member configured to transmit power generated from the motor to the plurality of tightening members.

Each tightening member may include a pair of support pieces spaced apart from each other with the opening interposed therebetween, the support pieces being fixed to the first cover layer, and a turnbuckle disposed between the pair of support pieces to vary a distance between the pair of support pieces, and the turnbuckle may include a main body, and a pair of screw rods screwed to both sides of the main body so as to be secured respectively to the pair of support pieces.

The transmission member may include a timing belt, and each tightening member may further include a pulley secured to the main body of the turnbuckle to transmit power provided from the timing belt to the main body.

The curvature control unit may further include a universal joint or coupling configured to connect a power shaft of the motor and a drive shaft of the timing belt to each other.

The transmission member may include a wire, and the main body of the turnbuckle may take the form of a pinion gear, and the turnbuckle may further include a rack connected to the wire to rotate the main body.

The transmission member may further include a plurality of idlers configured to guide the wire and maintain tensile force of the wire.

In accordance with another aspect of the invention, in a method of controlling curvature of a curved display device, the curved display device including a display panel, a bottom cover serving as a rear surface casing for the display panel, a bottom surface of the bottom cover being formed of a corrugated board including an intermediate layer provided with ridges, a first cover layer serving as a coating for an upper surface of the intermediate layer, and a second cover layer serving as a coating for a lower surface of the intermediate layer, and at least one curvature control unit disposed on the first cover layer that is a rear surface of the bottom cover, the first cover layer having an opening configured to expose the intermediate layer to correspond to the curvature control unit, the method includes controlling curvature of the bottom cover by applying tensile force in a longitudinal direction of the bottom cover using the curvature control unit.

The curvature control unit may include a plurality of tightening members arranged along the opening perforated in a width direction of the bottom cover, a motor configured to generate power, and a transmission member configured to transmit power generated from the motor to the plurality of tightening members, each tightening member may include a pair of support pieces spaced apart from each other with the opening interposed therebetween, the support pieces being fixed to the first cover layer, and a turnbuckle disposed between the pair of support pieces to vary a distance between the pair of support pieces, and the turnbuckle may include a main body, and a pair of screw rods screwed to both sides of the main body so as to be secured respectively to the pair of support pieces.

The method may further include rotating the main body of the turnbuckle in a first direction using the motor and the transmission member to increase a distance between the pair of support pieces, and rotating the main body of the turnbuckle in a second direction opposite to the first direction using the motor and the transmission member to reduce a distance between the pair of support pieces.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principle of the invention. In the drawings:

FIG. 1 is an explanatory view of a curved display device of the related art;

FIG. 2 is a schematic plan view showing a rear surface of a curved display device according to an embodiment of the present invention;

FIGS. 3A to 3C are explanatory views of a corrugated board;

FIG. 4 is a lateral perspective view showing a partial region of a bottom cover 10 according to the present invention;

FIG. 5 is a sectional view schematically showing a curvature control unit 8 shown in FIG. 2;

FIG. 6 is a view showing a configuration of a turnbuckle 22 shown in FIG. 5;

FIG. 7 is an explanatory view of a driving method of the curvature control unit 8;

FIG. 8 is a perspective view of a tightening member 14 according to a first embodiment of the present invention;

DETAILED DESCRIPTION OF THE ILLUSTRATED EMBODIMENTS

Hereinafter, a curved display device and a method of controlling curvature thereof according to an embodiment of the present invention will be described in detail with reference to the accompanying drawings.

For reference, a curved display device according to the present invention basically includes a display panel that displays an image. The display panel may be, for example, a liquid crystal display panel or organic light emitting diode panel. A substrate of the display panel may be formed of a glass substrate or flexible material.

FIG. 2 is a schematic plan view showing a rear surface of a curved display device according to an embodiment of the present invention.

The curved display device shown in FIG. 2 includes a bottom cover 10 that serves as a rear surface casing for a display panel (not shown), and at least one curvature control unit 8 disposed at a rear surface of the bottom cover 10.

The curvature control unit 8 is configured to apply tensile force in a longitudinal direction of the bottom cover 10, thereby varying curvature of the bottom cover 10. Therefore, according to the present invention, a user may vary curvature of the display panel according to desired situations, and the display panel has a curved surface or flat surface according to curvature of the bottom cover 10.

The bottom cover 10 is configured to receive the display panel. The curvature control unit 8 causes the bottom cover 10 to bend to a specific curvature, thereby varying curvature of the display panel. To this end, the bottom cover 10 is formed of a corrugated board such that a bottom surface configured to receive the display panel is easily bendable in a given direction (e.g., longitudinal direction).

Figure 3B:
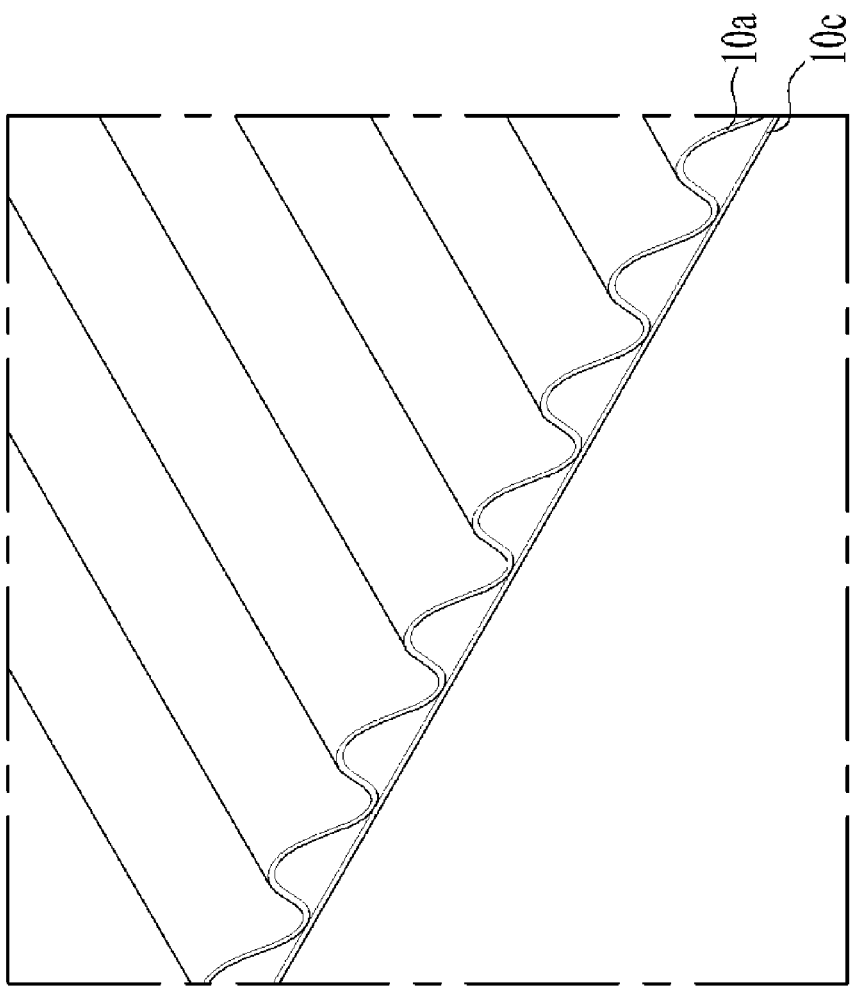

FIGS. 3A to 3C are explanatory views of the corrugated board. More specifically, FIG. 3A is a lateral perspective view of a partial region of the corrugated board, FIG. 3B is a lateral perspective view of the corrugated board having no first cover layer, and FIG. 3C is a schematic sectional view of the corrugated board having no first cover layer.

For reference, the corrugated board, as exemplarily shown in FIG. 3A, includes an intermediate layer 10a provided with ridges, a first cover layer 10b that serves as a coating for an upper surface of the intermediate layer 10a, and a second cover layer 10c that serves as a coating for a lower surface of the intermediate layer 10a.

With the above-described configuration, the corrugated board may easily bend only in an arrangement direction of the plural ridges on the intermediate layer 10a. In particular, the corrugated board is more easily bendable when any one of the first and second cover layers 10b and 10c is removed. For example, as exemplarily shown in FIGS. 3B and 3C, the corrugated board flexibly bends in an arrangement direction of the plural ridges when the first cover layer 10b is removed.

FIG. 4 is a lateral perspective view showing a partial region of the bottom cover 10 according to the present invention.

Referring to FIG. 4, the bottom surface of the bottom cover 10 according to the present invention is formed of the corrugated board, and the ridges of the intermediate layer 10a are arranged in a longitudinal direction of the bottom cover 10.

The bottom cover 10 has an opening 20 configured to expose the intermediate layer 10a. The opening 20 is acquired by patterning a portion of the first cover layer 10b constituting the rear side of the bottom cover 10. The opening 20 extends in a width direction of the bottom cover 10 to correspond to the curvature control unit 8.

Accordingly, the bottom cover 10 flexibly bends upon receiving tensile force in a longitudinal direction thereof, but does not bend upon receiving tensile force in a width direction thereof.

FIG. 5 is a sectional view schematically showing the curvature control unit 8 shown in FIG. 2, and FIG. 6 is a view showing a configuration of a turnbuckle 22 shown in FIG. 5. FIG. 7 is an explanatory view of a driving method of the curvature control unit 8.

Referring to FIGS. 2 and 5, the curvature control unit 8 includes a plurality of tightening members 14 arranged along the opening 20 in a width direction of the bottom cover 10, a motor 12 that generates power, and a transmission member 16 configured to transmit power generated from the motor 12 to the plurality of tightening members 14.

The tightening member 14 includes a pair of support pieces 24 spaced apart from each other with the opening 20 of the bottom cover 10 interposed therebetween, the support pieces 24 being fixed to the first cover layer 10b, and a turnbuckle 22 disposed between the pair of support pieces 24 to vary a distance between the pair of support pieces 24.

The turnbuckle 22, as exemplarily shown in FIG. 6, includes a rotatable main body 22a, and a pair of screw rods 22b screwed to both sides of the main body 22a so as to be secured respectively to the pair of support pieces 24. Here, each screw rod 22b is secured by being fastened with a bearing (30, see FIG. 8) of the support piece 24. Alternatively, differently from illustration of FIG. 6, the turnbuckle 22 may include the screw rod 22b only at one side of the rotatable main body 22a. In this case, one side of the main body 22a is pivotally rotatably connected to a first support piece, and the other end of the main body 22a is connected to a second support piece via the screw rod 22b. Hereinafter, the turnbuckle 22 will be described as including the pair of screw rods 22b.

More specifically, the pair of screw rods 22b includes a first screw rod rotatably fastened to one side of the main body 22a, and a second screw rod rotatably fastened to the other side of the main body 22b. Each of the first and second screw rods is secured to either support piece 24.

In operation of the above-described turnbuckle 22, the first and second screw rods are moved in opposite directions away from the main body 22a when the main body 22a is rotated in a first direction. Then, the first and second screw rods approach each other toward the center of the main body 22a when the main body 22a is rotated in a second direction opposite to the first direction.

According to the present invention, as exemplarily shown in FIG. 7, it is possible to increase a distance between the pair of support pieces 24 by rotating the main body 22a of the turnbuckle 22 in the first direction using the motor 12 and the transmission member 16. This causes the bottom cover 10, to which the pair of support pieces 24 is fixed, to bend by a specific curvature. Also, according to the present invention, it is possible to reduce a distance between the pair of support pieces 24 by rotating the main body 22a of the turnbuckle 22 in the second direction using the motor 12 and the transmission member 16. This causes gradual reduction in the curvature of the bottom cover 10 to which the pair of support pieces 24 is fixed.

Hereinafter, the transmission member 16 configured to transmit power generated from the motor 12 to the plurality of tightening members 14 will be described in detail.

Figure 9:
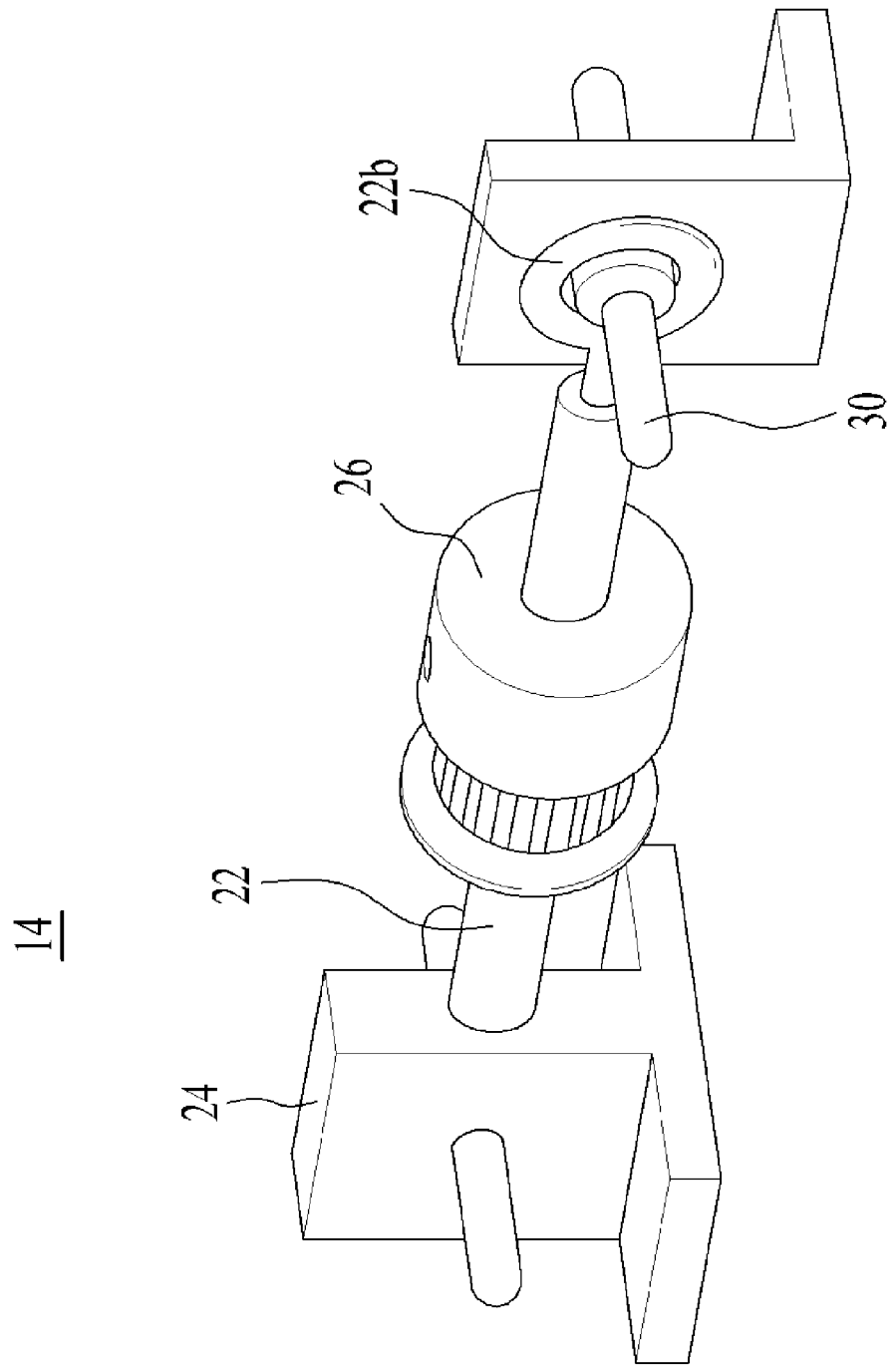
FIG. 9 is a view showing a configuration of the tightening member 14 connected to a timing belt 16.

FIG. 8 is a perspective view of the tightening member 14 according to a first embodiment of the present invention, and FIG. 9 is a view showing a configuration of the tightening member 14 connected to a timing belt 16.

Referring to FIGS. 8 and 9, in the first embodiment, a pulley 26 and a timing belt 16 are provided to simultaneously drive a plurality of turnbuckles 22 using fewer motors 12.

More specifically, the transmission member 16 includes the timing belt 16 that transmits power generated from the motor 12 to the turnbuckles 22. The timing belt 16 is connected to a power shaft of the motor 12 and connects the plurality of turnbuckles 22 to one another.

Meanwhile, the tightening member 14 includes the pulley 26 to rotate the main body 22a of the turnbuckle 22 using power applied from the timing belt 16. The pulley 26 is secured to the main body 22a of the turnbuckle 22 and rotates the main body 22a of the turnbuckle 22 when the timing belt 16 is moved. The pulley 26 may be integrated with the main body 22a of the turnbuckle 22.

When the bottom cover 10 bends via driving of the turnbuckle 22, the power shaft of the motor 12 may be spaced apart from a drive shaft of the timing belt 16. Accordingly, in the first embodiment, as exemplarily shown in FIG. 2, a universal joint 18 is further provided to connect the power shaft of the motor 12 and the drive shaft of the timing belt 16 to each other. The universal joint 18 may be replaced by a coupling.

Figure 10:
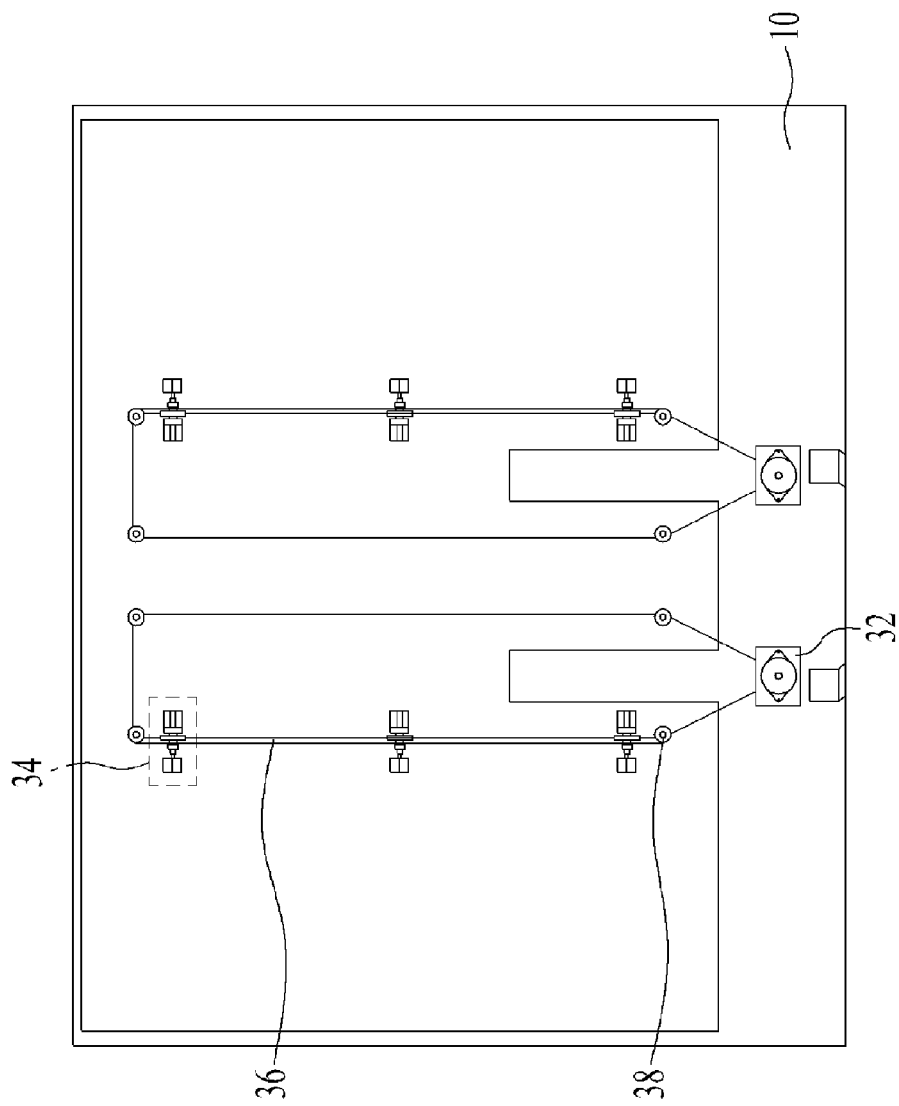
FIG. 10 is a schematic plan view showing a rear surface of a curved display device according to a second embodiment of the present invention.
Figure 11:
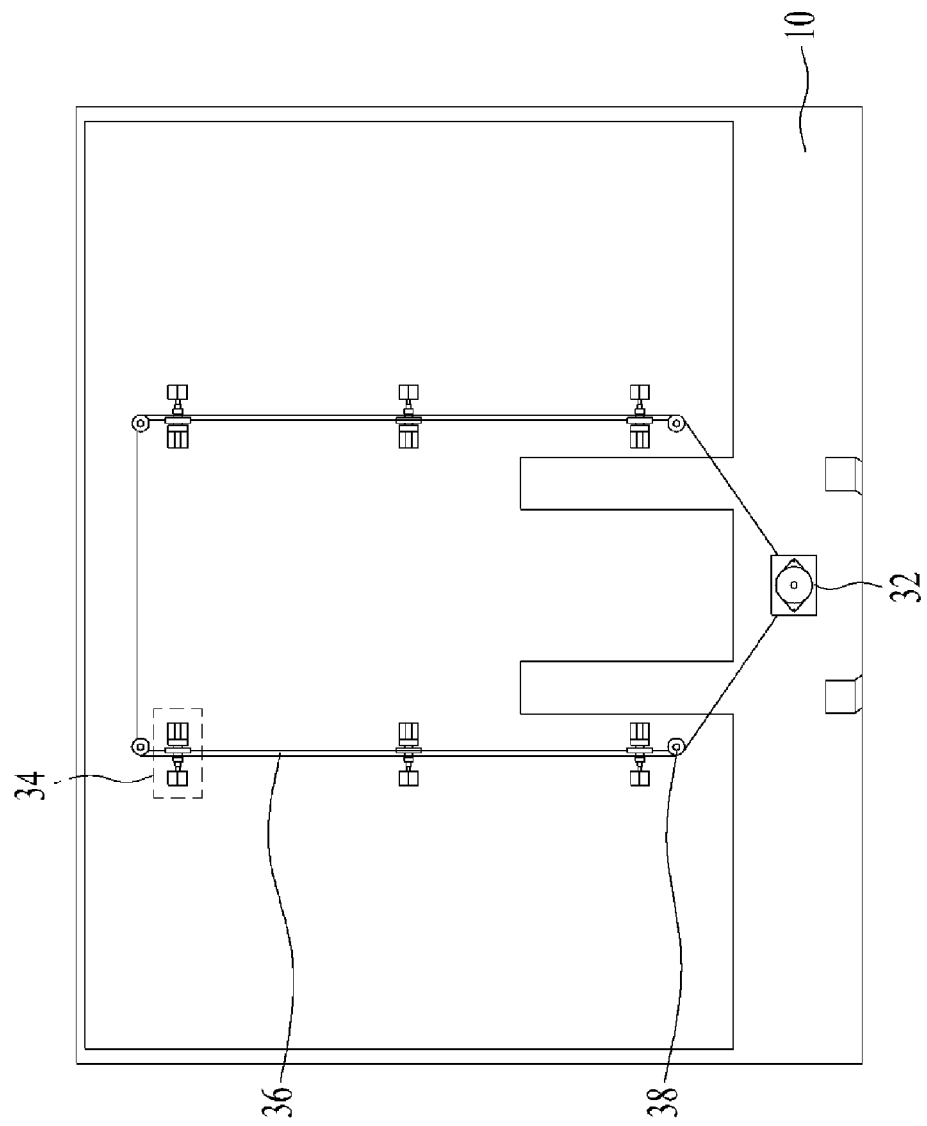
FIG. 11 is an enlarged perspective view of a tightening member 34 shown in FIG. 10.
Figure 12:
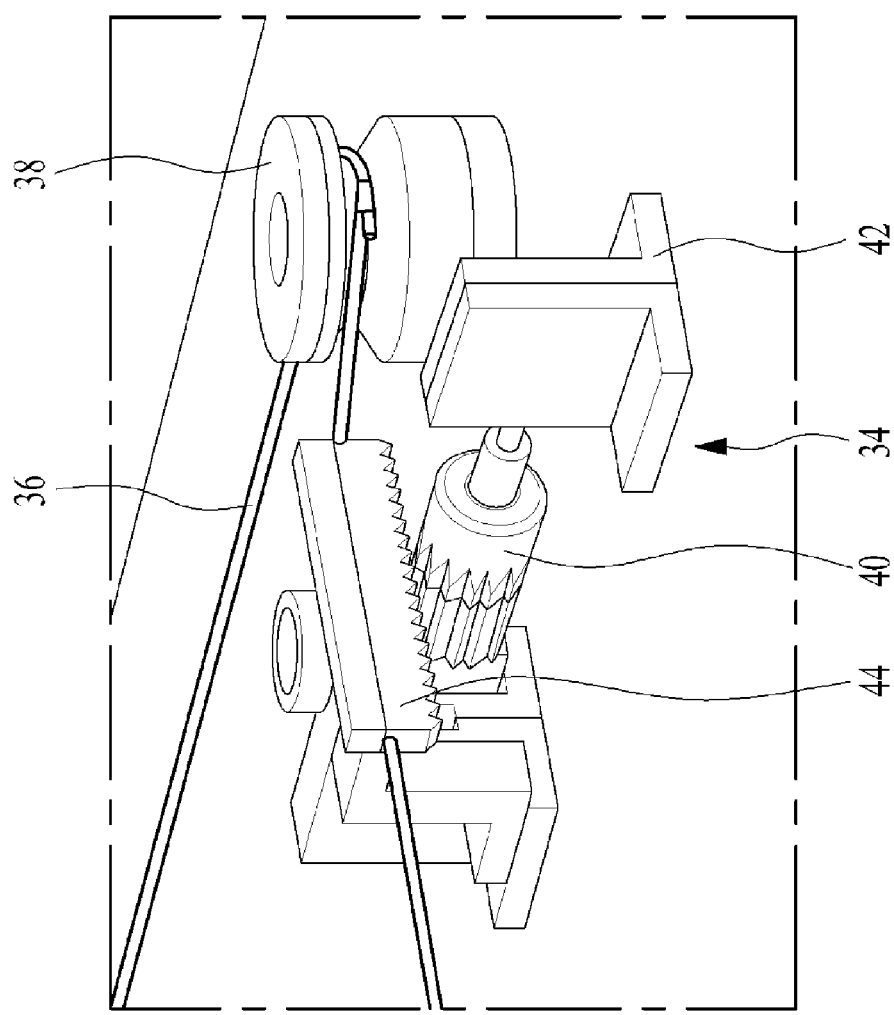
FIG. 12 is a schematic plan view showing a rear surface of a curved display device according to another embodiment of the present invention.

FIG. 10 is a schematic plan view showing a rear surface of a curved display device according to a second embodiment of the present invention. FIG. 11 is an enlarged perspective view of a tightening member 34 shown in FIG. 10. FIG. 12 is a schematic plan view showing a rear surface of a curved display device according to another embodiment of the present invention.

The curved display device according to the second embodiment includes a wire 36 and a plurality of idlers 38 to simultaneously drive a plurality of turnbuckles 40 using fewer motors 32, differently from that of the first embodiment.

More specifically, in the second embodiment, as exemplarily shown in FIGS. 10 and 11, at least one motor 32, the wire 36 configured to transmit power generated from the motor 32 to a plurality of tightening members 34, and the plurality of idlers 38 are provided, and each of the plurality of tightening members 34 includes a pair of support pieces 42 and the turnbuckle 40 to vary a distance between the support pieces 34.

The motor 32 is connected to the wire 36 and drives the plurality of tightening members 34. One motor 32 may be provided as exemplarily shown in FIG. 12.

The wire 36 is connected to a power shaft of the motor 32 and connects the turnbuckles 40 of the plurality of tightening members 34 to one another. The wire 36 is connected to a rack 44 and rotates a main body of the turnbuckle 40 in the form of a pinion gear.

Each of the plurality of tightening members 34 includes the pair of support pieces 42 spaced apart from each other with an opening of the bottom cover 10 interposed therebetween, the support pieces 42 being fixed to the first cover layer 10b, and the turnbuckle 40 disposed between the pair of support pieces 42 to vary a distance between the pair of support pieces 42. Here, the turnbuckle 40 takes the form of a pinion gear toothengaged with the rack 44.

The plurality of idlers 38 serves not only to guide the wire 36, but also to maintain tensile force of the wire 36.

The above-described second embodiment proposes a driving method as follows.

The motor 32 is driven to pull the wire 36, and in turn the rack 44 connected to the wire 36 rotates the main body of the turnbuckle 40 in the form of a pinion gear. Thereby, a distance between the pair of neighboring support pieces 42 varies, causing variation in the curvature of the bottom cover 10.

As is apparent from the above description, the present invention proposes a bottom cover formed of a corrugated board, and a curvature control unit provided at a rear surface of the bottom cover to apply tensile force to the surface of the bottom cover. Accordingly, the present invention may vary curvature of the bottom cover to provide a display panel with a curved surface or flat surface in response to user need.

It will be apparent that, although the preferred embodiments have been shown and described above, the invention is not limited to the above-described specific embodiments, and various modifications and variations can be made by those skilled in the art without departing from the gist of the appended claims. Thus, it is intended that the modifications and variations should not be understood independently of the technical sprit or prospect of the invention.

What is claimed is:
1. A curved display device comprising:
   a display panel;
   a bottom cover serving as a rear surface casing for the display panel; and
   at least one curvature control unit disposed on a rear surface of the bottom cover to control curvature of the bottom cover by applying tensile force to the rear surface of the bottom cover in a longitudinal direction of the bottom cover, wherein the bottom surface of the bottom cover is formed of a corrugated board including an intermediate layer provided with ridges, a first cover layer serving as a coating for an upper surface of the intermediate layer, and a second cover layer serving as a coating for a lower surface of the intermediate layer, and wherein the first cover layer has an opening configured to expose the intermediate layer to correspond to the curvature control unit.

2. The device according to claim 1, wherein the curvature control unit includes:

a plurality of tightening members arranged along the opening perforated in a width direction of the bottom cover;

a motor configured to generate power; and a transmission member configured to transmit power generated from the motor to the plurality of tightening members.

3. The device according to claim 2, wherein each tightening member includes:

a pair of support pieces spaced apart from each other with the opening interposed therebetween, the support pieces being fixed to the first cover layer; and a turnbuckle disposed between the pair of support pieces to vary a distance between the pair of support pieces, and wherein the turnbuckle includes a main body, and a pair of screw rods screwed to both sides of the main body so as to be secured respectively to the pair of support pieces.

4. The device according to claim 3, wherein the transmission member includes a timing belt, and wherein each tightening member further includes a pulley secured to the main body of the turnbuckle to transmit power provided from the timing belt to the main body.

5. The device according to claim 4, wherein the curvature control unit further includes a universal joint or coupling configured to connect a power shaft of the motor and a drive shaft of the timing belt to each other.

6. The device according to claim 3, wherein the transmission member includes a wire, and wherein the main body of the turnbuckle takes the form of a pinion gear, and the turnbuckle further includes a rack connected to the wire to rotate the main body.

7. The device according to claim 6, wherein the transmission member further includes a plurality of idlers configured to guide the wire and maintain tensile force of the wire.

8. A method of controlling curvature of a curved display device, the curved display device comprising a display panel, a bottom cover serving as a rear surface casing for the display panel, a bottom surface of the bottom cover being formed of a corrugated board including an intermediate layer provided with ridges, a first cover layer serving as a coating for an upper surface of the intermediate layer, and a second cover layer serving as a coating for a lower surface of the intermediate layer, and at least one curvature control unit disposed on the first cover layer that is a rear surface of the bottom cover, the first cover layer having an opening configured to expose the intermediate layer to correspond to the curvature control unit, wherein the method comprises controlling curvature of the bottom cover by applying tensile force in a longitudinal direction of the bottom cover using the curvature control unit.

9. The method according to claim 8, wherein the curvature control unit includes:

a plurality of tightening members arranged along the opening perforated in a width direction of the bottom cover;

a motor configured to generate power; and a transmission member configured to transmit power generated from the motor to the plurality of tightening members, wherein each tightening member includes:

a pair of support pieces spaced apart from each other with the opening interposed therebetween, the support pieces being fixed to the first cover layer; and a turnbuckle disposed between the pair of support pieces to vary a distance between the pair of support pieces, and wherein the turnbuckle includes a main body, and a pair of screw rods screwed to both sides of the main body so as to be secured respectively to the pair of support pieces.

10. The method according to claim 9, further comprising:

rotating the main body of the turnbuckle in a first direction using the motor and the transmission member to increase a distance between the pair of support pieces; and rotating the main body of the turnbuckle in a second direction opposite to the first direction using the motor and the transmission member to reduce a distance between the pair of support pieces.

\* \* \* \* \*